United States Patent [19]
Karp

[11] Patent Number: 5,469,154
[45] Date of Patent: Nov. 21, 1995

[54] MULTICONNECTION SWITCHING NETWORKS

[75] Inventor: Richard M. Karp, Berkeley, Calif.

[73] Assignee: DVA Ltd., Alamo, Calif.

[21] Appl. No.: 129,337

[22] Filed: Sep. 30, 1993

Related U.S. Application Data

[63] Continuation of Ser. No. 657,447, Feb. 19, 1991, abandoned.

[51] Int. Cl.$^6$ ........................................................ H04Q 1/00
[52] U.S. Cl. ............................................. 340/825.8; 370/54
[58] Field of Search ........................... 340/825.8; 370/54, 370/58.1, 58.2

[56] References Cited

U.S. PATENT DOCUMENTS

| | | | |
|---|---|---|---|
| 3,674,938 | 7/1972 | Jacob | 340/825.8 |
| 4,566,007 | 1/1986 | Richards | 340/825.8 |
| 4,817,083 | 3/1989 | Richards | 370/59 |
| 5,285,444 | 2/1974 | Sakurai et al. | 340/825.8 |
| 5,311,506 | 5/1994 | Beisel | 370/58.1 |
| 5,319,639 | 6/1994 | Guha | 370/58.1 |

*Primary Examiner*—Brian Zimmerman
*Attorney, Agent, or Firm*—James F. Mitchell

[57] ABSTRACT

Multi-stage switching networks for connecting any one of $N_2$ output ports to any one of $N_1$ input ports that are strictly non-blocking or are rearrangeable to provide a wide-sense non-blocking connecting path between any one output port and any selected one of $N_1$ input ports without restriction on the number of output ports which may selectively connect to a single input port.

10 Claims, 6 Drawing Sheets

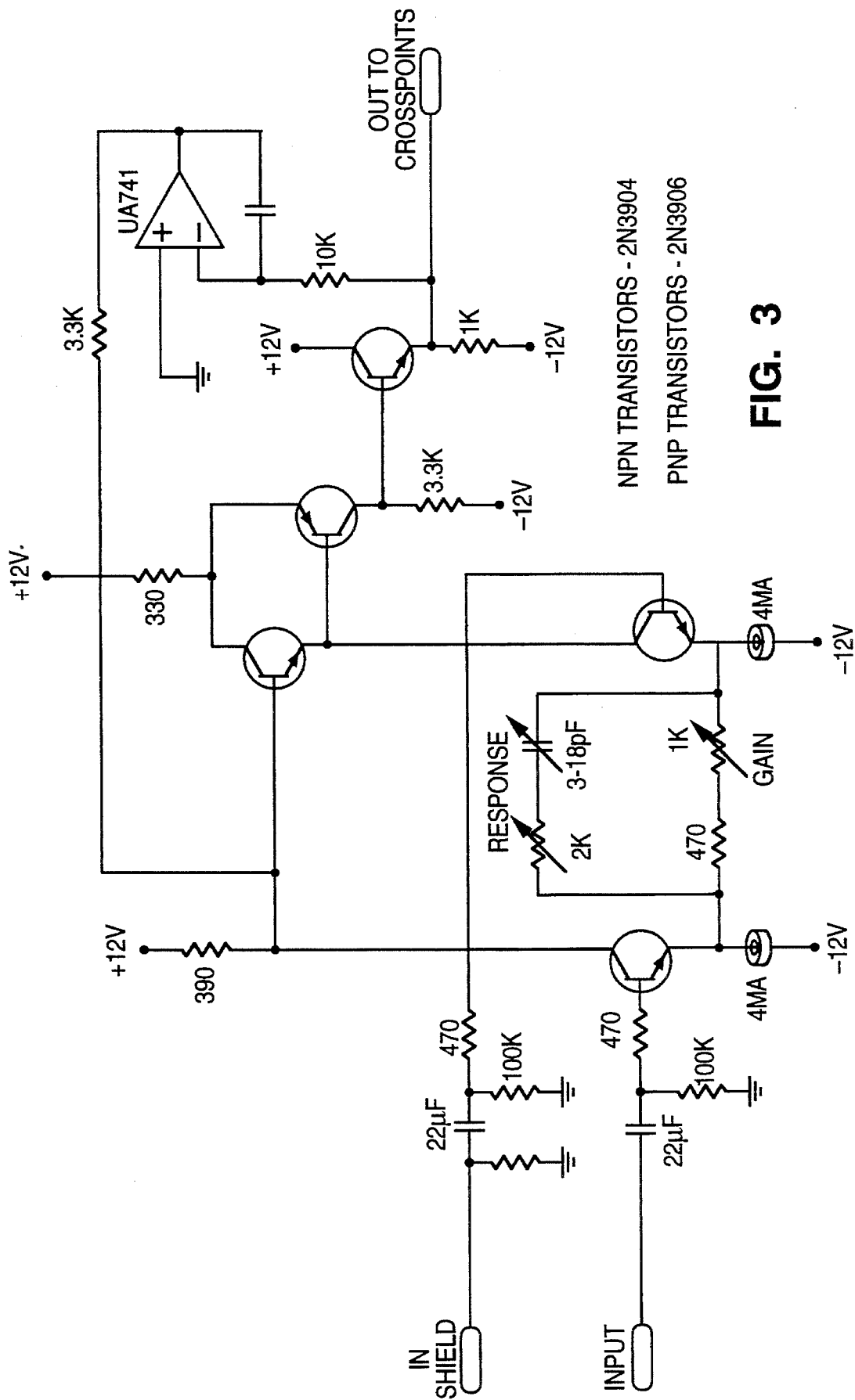

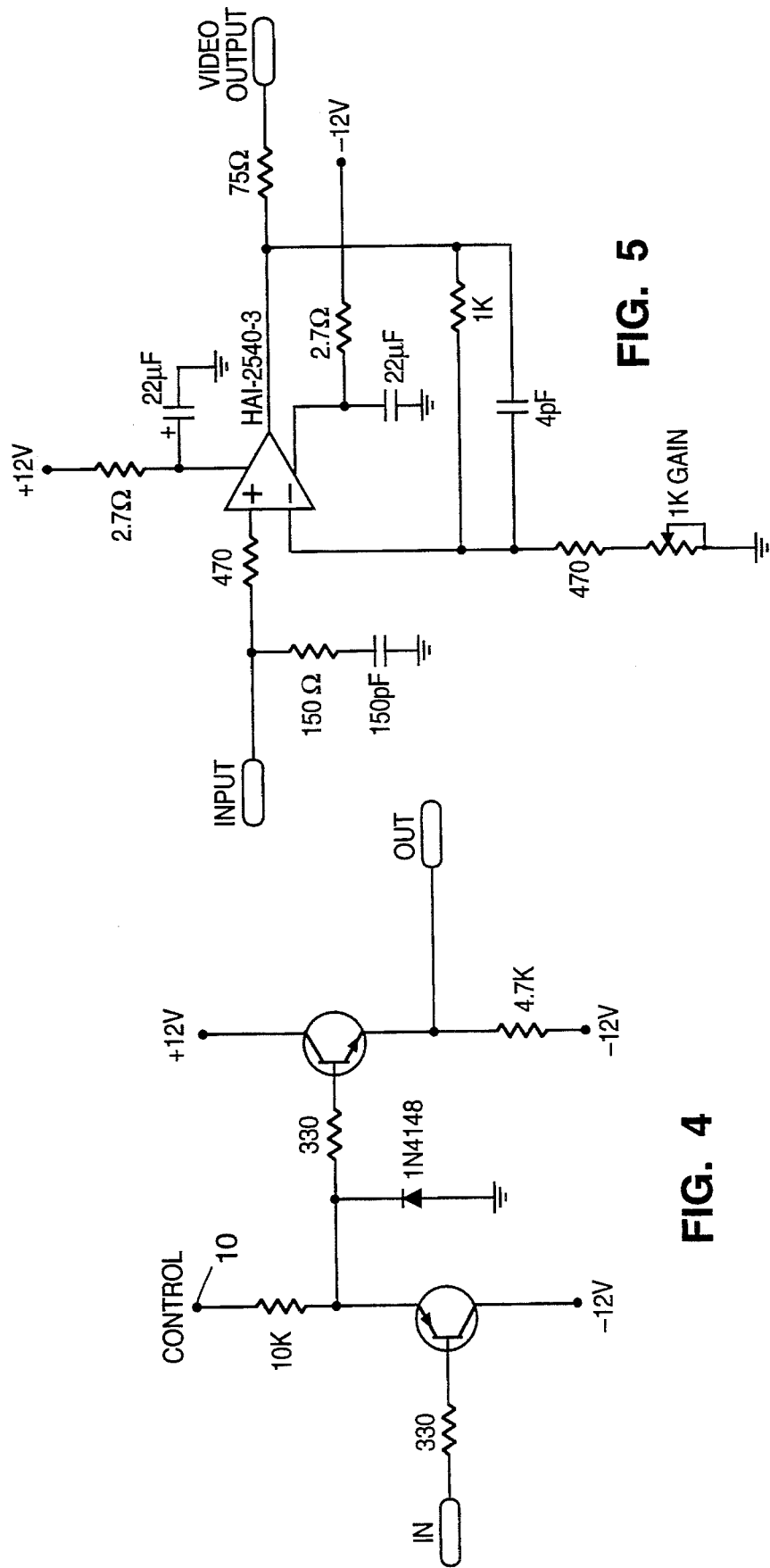

1

MULTICONNECTION SWITCHING NETWORKS

This application is a continuation of application Ser. No. 07/657,447, filed Feb. 19, 1991, now abandoned.

This invention relates to switching networks and more particularly to multiconnection broadcast quality switching networks that are rearrangeable to be non-blocking in the wide sense so that any one of multiple output ports can selectively connect to any one of multiple input ports.

BACKGROUND OF THE INVENTION

The simplest switching network capable of interconnecting $N_1$ input ports and $N_2$ output ports is a rectangular $N_1 \times N_2$ matrix of switching elements or crosspoints. Such a matrix is strictly non-blocking in that any idle output port can selectively connect any input port regardless of the state of interconnection among other input and output ports.

Switching networks useful in broadcast service require a large number of output ports that selectively can be connected to any one of a large number of input ports. The audio and video signals switched in the networks have a very wide bandwidth and dynamic range at power levels requiring expensive switches or crosspoints. Accordingly, minimizing the total number of crosspoints required becomes important simply from a cost standpoint.

Reduction in the total number of required crosspoints from $N_1 \times N_2$ can be achieved by multiple stage switching as is described by Charles Clos in his article "A Study of Non-Blocking Switching Networks" published in *The Bell System Technical Journal*, March 1953, pages 406–424. Three-stage multiconnection Clos networks have been designed which are non-blocking in the wide sense, i.e., non-blocking when a particular connection strategy is followed, as discussed in the article by F.K. Hwang "Three-Stage Multiconnection Networks which are Non-Blocking in the Wide Sense" published in *The Bell System Technical Journal*, Vol. 58, No. 10, December 1979, pages 2183–2187.

Rearrangeable multi-stage switching networks for broadcast service are described by Gaylord W. Richards and Frank K. Hwang in "A Two-Stage Rearrangeable Broadcast Switching Network" published in the *IEEE Transactions on Communications*, Vol. Com33, No. 10, October 1985; in Richards U.S. Pat. No. 4,566,007 entitled "Rearrangeable Multiconnection Switching Networks" and in the references there cited; in G. W. Richards U.S. Pat. No. 4,817,083 entitled "Rearrangeable Multiconnection Switching Networks Employing Both Space Division and Time Division Switching" and in other publications there identified.

In the foregoing prior art, a recognized problem exists in the expense and reduced communication integrity of known multiconnection broadcast quality switching networks.

SUMMARY OF THE INVENTION

This invention implements multi-stage switching networks of shallow depth with a unique first-stage interconnection to minimize the requisite number of crosspoint switches. The networks either inherently through the relation of that first-stage interconnection and the number of input and output ports may be strictly non-blocking or through signal path rearrangement may be non-blocking in the wide sense. The described architecture employs multi-stages each having a plurality of crossbars. In one embodiment each output of each first-stage crossbar connects to one input to two second-stage crossbars. In another embodiment, the input ports to the first-stage of the switching network are hardwired to two separate first-stage crossbars. The crosspoints in the several crossbars of the networks may be switched in accord with a routing algorithm to rearrange routing paths and to select the most efficient signal path from an output port to a selected input port.

DRAWING DESCRIPTION

FIG. 3 is a schematic diagram of a typical video input amplifier useful with the three-stage switching network of FIG. 2;

FIG. 4 is a schematic diagram of a typical crosspoint useful in the switching network of FIG. 2;

FIG. 5 is a typical video output amplifier useful with the switching network of FIG. 2;

DESCRIPTION OF THE INVENTION

Figure 1:
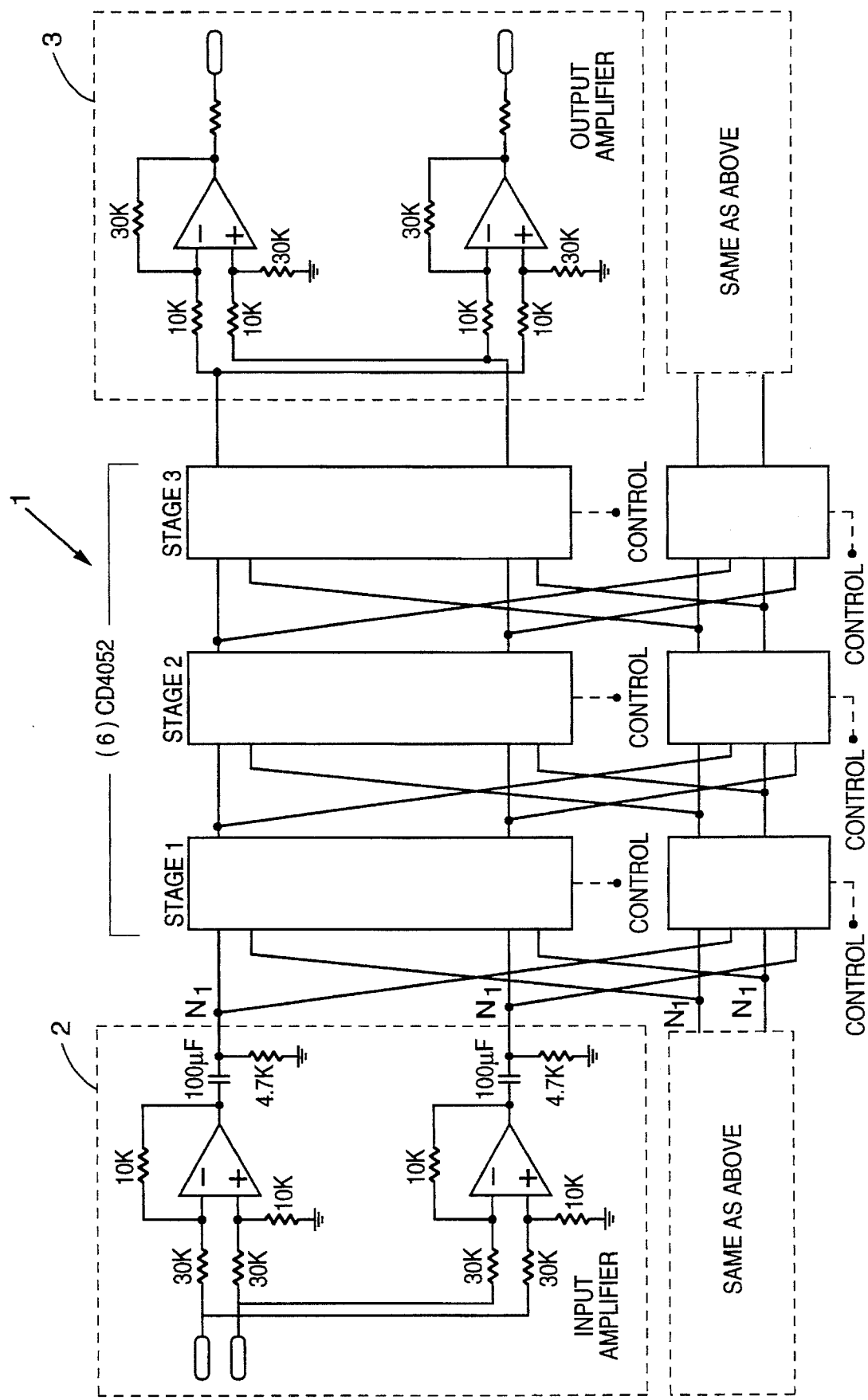
FIG. 1 is a schematic block diagram of a broadcast quality system for audio signals employing a three-stage switching network.

FIG. 1 illustrates in block diagram form a system employing a switching network generally referred to as 1 in a system for processing audio signals of broadcast quality. A separate audio input amplifier 2 connects each audio signal to each one of several input ports $N_1$ of the switching network 1. An audio output amplifier 3 connects each of the output ports $N_2$ of the switching network to downstream processing electronics.

Figure 2:
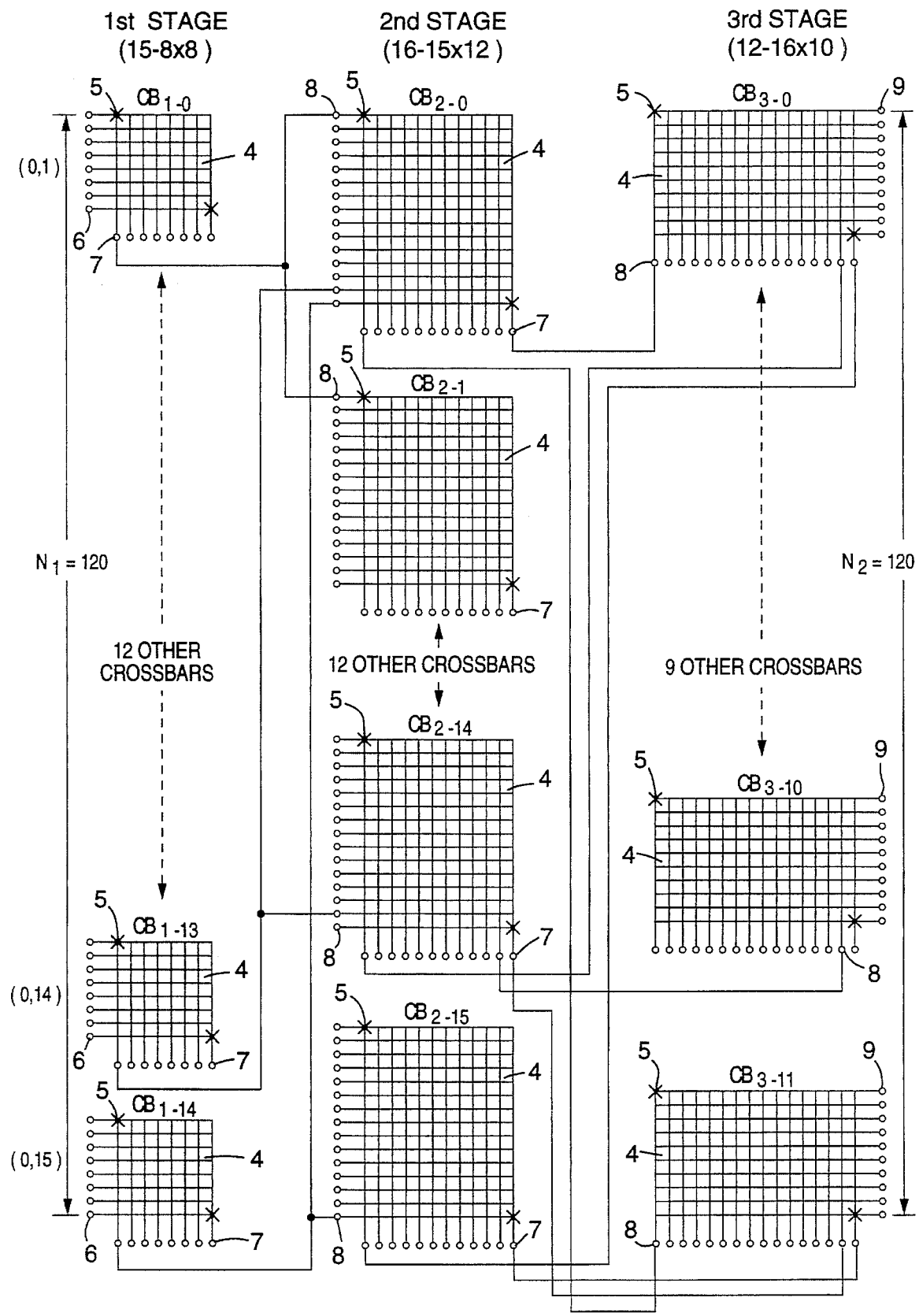
FIG. 2 is a schematic block diagram of the three-stage switching network of this invention.

The switching network 1 in a first embodiment of the invention is schematically illustrated in FIG. 2. The architecture comprises a plurality of first-stage crossbars 4 shown as fifteen 8×8 crossbars $CB_{1-0}$ through $CB_{1-14}$. Each crossbar 4 is a complete n m crosspoint network of depth one with transducer switches or crosspoints 5, n m in number. A typical crosspoint is illustrated in FIG. 4. Hardwired links interconnect crosspoints 5 with multiple inputs 6 and multiple outputs 7. In the illustrated first-stage there are fifteen 8×8 crossbars each having eight input ports 6 and eight outputs 7. Collectively the first-stage crossbars have $N_1$ or one hundred twenty input ports 6 each one interconnecting with an audio input amplifier, for example, as shown in FIG. 1 or a video input amplifier as shown typically in FIG. 3.

The second-stage crossbars 4 in FIG. 2 are sixteen 15×12 crossbars $CB_{2-0}$ through $CB_{2-15}$, each having fifteen inputs 8 and twelve outputs 7. There are collectively two hundred forty inputs to the second-stage crossbars. Each output 7 of each first-stage crossbar 4 separately connects to an input 8 in each of two second-stage crossbars. There collectively are one hundred twenty outputs 7 to the first-stage. For example, the first output 7 of first-stage crossbar $CB_{1-0}$ connects to the first of the fifteen inputs 8 of second-stage crossbar $CB_{2-0}$ and to the first input 8 of the second crossbar $CB_{2-1}$ in the second stage. Likewise, the first input of first-stage crossbar $CB_{1-14}$ connects to an input 8 to crossbar $CB_{2-0}$ as well as an input 8 to second-stage crossbar $CB_{2-15}$, etc. Outputs 7 of all the others of the fifteen first-stage crossbars similarly connect to the inputs 8 of two second-stage crossbars.

In FIG. 2 the third-stage of the switching network has twelve 16×10 crossbars $CB_{3-0}$ through $CB_{3-11}$. There collectively are one hundred ninety-two inputs 8 to the third stage and one hundred ninety-two outputs 7 to the second-stage. Each output 7 of the second-stage crossbars 4 connects only to an input 8 of one of the third-stage crossbars 4 on a one-to-one basis. For example, the first output of second-stage crossbar $CB_{2-0}$ connects to the first input of third-stage crossbar $CB_{3-11}$. The twelfth output of second-stage crossbar $CB_{2-0}$ connects to the first input 8 to third-stage crossbar $CB_{3-0}$. A similar interconnection is provided between the twelve outputs of each of the sixteen second-stage crossbars and each of the sixteen inputs to the twelve third-stage crossbars. The third-stage output ports 9 of its twelve crossbars each connect to a typical audio output amplifier 3 or video output amplifier as shown in FIG. 5 and then on to processing electronics. Collectively there are $N_2$ output ports 9 in the third-stage or the one hundred twenty shown in FIG. 2.

The architecture for the 120×120 three-stage switching network in FIG. 2 has 5760 crosspoint switches, i.e. the crosspoints in 15-8×8 crossbars at the first stage, 16-15×12 crossbars at the second stage and 12-16×10 crossbars at the third stage total 5760 switches. Using a control algorithm for signal path revision, when necessary, this network allows each output port 9 to select any input port 6. The required non-interfering input-output paths will be set up regardless of the interconnection of other output-input ports. Each input port 6 can be selected by any number of output ports 9.

The Logical Design of the Three-Stage Network

One novel feature of this switching network is the pattern of interconnection between the first and second-stage crossbars. Each output 7 of a first-stage crossbar connects to one input 8 of two second-stage crossbars The sixteen second-stage crossbars are numbered 0 through 15. The interconnection pattern for each of the eight outputs 7 of each of the fifteen first-stage crossbars is specified in its row by the pair of second-stage crossbars to which each output connects. The pattern of interconnection is as follows:

| First-Stage Crossbar | Pairs of Second-Stage Crossbars |
|---|---|
| 1 | (0 1), (2 14), (3 13), (4 12), (5 11),(6 10), (7 9), (8 15) |
| 2 | (0 2), (3 14), (4 13), (5 12), (6 11), (7 10), (8 9), (1 15) |
| 3 | (0 3), (1 2), (4 14), (5 13), (6 12), (7 11), (8 10), (9 15) |
| 4 | (0 4), (1 3), (5 14), (6 13), (7 12), (8 11), (9 10), (2 15) |
| 5 | (0 5), (1 4), (2 3), (6 14), (7 13), (8 12), (9 11), (10 15) |
| 6 | (0 6), (1 5), (2 4), (7 14), (8 13), (9 12), (10 11), (3 15) |
| 7 | (0 7), (1 6), (2 5), (3 4), (8 14), (9 13), (10 12), (11 15) |
| 8 | (0 8), (1 7), (2 6), (3 5), (9 14), (10 13), (11 12), (4 15) |
| 9 | (0 9), (1 8), (2 7), (3 6), (4 5), (10 14), (11 13), (12 15) |
| 10 | (0 10), (1 9), (2 8), (3 7), (4 6), (11 14), (12 13), (5 15) |
| 11 | (0 11), (1 10), (2 9), (3 8), (4 7), (5 6), (12 14), (13 15) |
| 12 | (0 12), (1 11), (2 10), (3 9), (4 8), (5 7), (13 14), (6 15) |
| 13 | (0 13), (1 12), (2 11), (3 10), (4 9), (5 8), (6 7), (14 15) |
| 14 | (0 14), (1 13), (2 12), (3 11), (4 10), (5 9), (6 8), (7 15) |
| 15 | (0 15), (1 14), (2 13), (3 12), (4 11), (5 10), (6 9), (7 8) |

For example, the third output of first-stage crossbar 6 is connected by wires (not switches) to an input of second-stage crossbar 2 and an input of second-stage crossbar 4. The rule determining this interconnection pattern is quite simple. It is based on addition mod 15. This is just like regular addition except that, when regular addition gives a sum greater than 14, we subtract 15 from the result. A couple of examples of mod 15 arithmetic:5+8=13; 9+12=6, because regular addition gives 21, one subtracts 15. With the exception of the pair involving 15, all the pairs of numbers in the list for firststage crossbar 11 sum to 11 mod 15. A similar thing happens for each of the first-stage crossbars, i.e. for crossbar 10, they sum to 10 mod 15 except for the pair involving 15.

The connections between the second-stage and third-stage crossbars are analogous to those between the second and third stages of a Clos network. Each third-stage crossbar receives one input from each second-stage crossbar.

One Routing control Algorithm

The crosspoint switches 5 in each first-stage crossbar are set to establish a one-to-one connection between the input ports 6 and outputs 7 of that crossbar. Suppose the network starts out in some state where the first-stage switch settings permit all the required signals to be routed to the output port 9 which has selected it. Every time an output port 9 of the network selects an input port 6, the control algorithm attempts to route the new signal without changing the first-stage switch settings. This is done by attempting to provide a routing solution associated with the third-stage crossbar 4 on which the output port 9 resides. Among all the possible solutions, that solution is selected which involves a minimum of signal path revision.

The routing control algorithm starts by assuming that the settings of the first-stage crossbars are fixed, and determines whether a required signal path can be set up. If this proves impossible, then the algorithm changes the first-stage settings by switch control signals from a matrix management computer applied to the crosspoint control inputs 10 as shown in FIG. 4. As long as the switch settings in the first-stage crossbars are held fixed, the input signal at each input port $N_1$ can reach two second-stage crossbars. For example, if a particular input signal to first-stage crossbar 13 is connected to the fifth output of that crossbar, then (consulting the above connection list) this signal connects to inputs to second-stage crossbars 4 and 9.

Holding the first-stage settings fixed, the algorithm considers each third-stage crossbar and tests whether the input signals it needs can be obtained from the second-stage crossbars. For example, consider a particular third-stage crossbar in which each of the ten outputs has selected some input signal at an input port. That signal is available at the input to two second-stage crossbars. The control algorithm starts by making a list of those ten pairs of second-stage crossbars. In this example, assume that the ten output ports of the third-stage crossbar have selected ten distinct input signals, and these signals are available from the following pairs of second-stage crossbars. (3 9) (4 13) (4 12) (12 14)(1 2) (10 11) (5 8) (2 10) (2 9) (4 14). Thus, the first of these signals is available at the input to second-stage crossbars 3 and 9, the second one is available on second-stage crossbars 4 and 13 and so forth The second-stage crosspoints have to be set so that each of these ten signals is led into the third-stage crossbar being considered. Each second-stage crossbar can provide only one of these signals, since each second-stage crossbar has only one connection to the given third-stage crossbar. If one of the two numbers in each pair can be selected so that the same number does not need to be selected in two or more pairs, that number indicates which of the two possible second-stage crossbars provides the signal. A solution to the present example is shown by underscoring. (3 <u>9</u>) (4 <u>13</u>) (<u>4</u> 12) (<u>12</u> 14) (<u>1</u> 2) (<u>10</u> 11) (<u>5</u> 8) (2 <u>10</u>) (2 <u>9</u>) (4 <u>14</u>). Once a solution has been found for each third-stage crossbar, it is an easy matter to set the second-stage and third-stage crosspoint switches by control signals to crosspoint control input 10 of FIG. 4. For example, the 3 is underscored in the pair (3 9). The corresponding input signal comes in on first-stage crossbar 12 (3+9 is 12 in mod 15 arithmetic) and is available at input ports of second-stage crossbars 3 and 9. Since 3 is underscored rather than 9, the signal must be routed through second-stage crossbar 3 to the third-stage crossbar being considered, and from there to the correct output port.

Suppose that the output port which had selected the input signal corresponding to the pair (5 8) now selects (1 3) instead. Then the new routing solution for that third-stage crossbar involves the following ten pairs:

(3 9) (4 13) (4 12) (12 14) (1 2) (10 11) (1 3) (2 10) (2 9) (4 14).

A solution is still possible as follows:

(3̲ 9) (4 13̲) (4̲ 12) (12̲ 14) (1 2̲) (10 11̲) (1̲ 3) (2 10̲) (2 9̲) (4 14̲).

The solution involves a signal path revision. The pair (1 2) had the 1 underscored originally, but has the 2 underscored in the solution to the modified selection. In other words, the input signal corresponding to the pair (1 2) originally reached third-stage crossbar via second-stage crossbar 1, but now second-stage crossbar 1 is used for input signal (1 3), and input signal (1 2) must be taken off second-stage crossbar 2. The solution revises the smallest number of signal paths.

Continuing the example, suppose now that the output port which had selected input signal (2 10) now selects (12 13) instead. Then the routing solution involves the following pairs: (3 9) (4 13) (4 12) (12 14) (1 2) (10 11) (1 3) (12 13) (2 9) (4 14). There is no solution this time. There are five distinct input signals that can be obtained only from second-stage crossbars 4, 12,13 and 14. These signals are (4 13), (4 12), (12 14), (12 13) and (4 14). These second-stage crossbars can route only one input signal to a third-stage crossbar. The requests cannot be satisfied until the setting of one or more first-stage crossbars is changed.

Thus, the routing control algorithm determines a routing solution for a particular set of input signal selections. When several solutions exist, is selects the one that requires the least amount of signal path revision. When it is necessary to change the settings of the first-stage crossbars, the algorithm decides how to do it.

In describing the routing control algorithm, it is useful to think in terms of graphs. A graph is nothing more than a collection of points and lines, where each line connects two of the points. The points correspond to the second-stage crossbars, and the lines correspond to the input signals. Each input signal goes to a pair of second-stage crossbars, and the line corresponding to that input signal connects the points corresponding to those two second-stage crossbars. The graph corresponding to the original example is shown in FIG. 8.

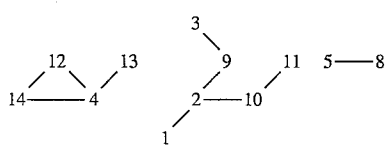

FIG. 8. Graph corresponding to original example (3 9) (4 13) (4 12) (12 14) (1 2) (10 11) (5 8) (2 10) (2 9) (4 14)

A solution can be depicted by placing an arrow on each line of the graph. The arrow points to the second-stage crossbar that is selected, or, equivalently, to the number that is underscored. For example, the 3 in the pair (3 9) is underscored, and so the arrow on line (3 9) is directed toward the 3. In terms of arrows, a solution must have at most one arrow directed toward each point. FIG. 9 shows a solution to the first input signal selections.

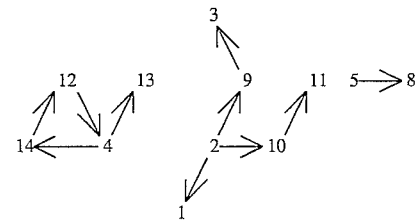

FIG. 9. Solution to example of FIG. 8.

A path is a sequence of lines laid end-to-end, and a cycle is a path that closes on itself. Examples of a path and of a cycle, taken from the example of FIG. 8, are

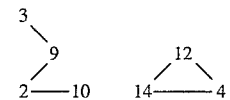

FIG. 10. A path and a cycle.

Any graph breaks naturally into components. Two points are in the same component if there is some path joining them, and in ii different components if there is no path joining them. In the first example, there are three components. One of them contains the points 4,12,13 and 14, another contains the points 1,2,3,9,10 and 11, and the third component contains the points 5 and 8.

A particular selection has a solution if, and only if, each of its components contains at most one cycle. In the first example, the component containing points 4,12,13 and 14 has one cycle, as follows:

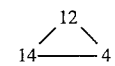

The other two components do not contain cycles.

The following figure shows the selection in the third example It has no solution because the component containing points 4,12,13 and 14 includes more than one cycle.

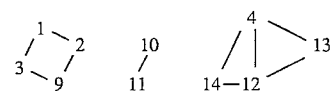

FIG. 11. Graph corresponding to the third example. (3 9) (4 13) (4 12) (12 14) (12) (10 11) (13) (12 13) (2 9) (4 14)

Each component can be dealt with separately. One has to distinguish between cyclic components, which contain exactly one cycle each, and trees, which do not contain cycles. In a cyclic component there are exactly two ways to direct the arrows so that no two arrows are directed toward the same point. The arrows on the cycle must be lined up head to tail (there are exactly two ways to do this ) and the arrows on the other lines of the component must be directed away from the cycle. FIG. 12 shows the two ways to orient the arrows on the cyclic component of the graph given in

FIG. 8.

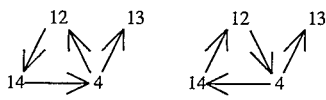

FIG. 12. The two ways of directing the arrows on a cyclic component

In the case of a tree, there are as many ways of directing the arrows as there are nodes in the tree. Each solution is obtained by choosing one of the nodes of the tree as a root, and making sure that no arrow is directed toward the root. The choice of the root forces the directions of all the arrows in the tree. FIG. 13 shows the five ways of directing the arrows on a tree with five points.

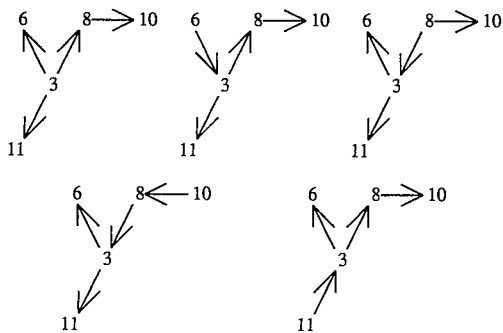

FIG. 13. Five ways of directing the arrows on a five-point tree.

The first step in a solution algorithm for crosspoint rearrangement is to find a component. The component—finding procedure starts by selecting any point whose component has not been found, and proceeds to find the points and lines of the component in which the chosen point lies. Two arrays are built, one listing the points in the component and the other listing the lines in the component. Initially the point array contains the chosen point, and the line array is empty. The algorithm keeps searching for lines (each line is a pair of points) which are not in the line array but contain at least one of the points in the point array. Every time such a line is found, it is added to the line array, and its points are added to the point array, if they are not already there. This continues until no further points or lines can be added, and at that stage one has the desired component. This procedure is implemented with some care, in order to avoid repetitious scanning of the point and line arrays.

Trace through the example of FIG. 8 in which the lines are (3 9) (4 13) (4 12) (12 14) (1 2) (10 11) (5 8) (2 10) (2 9) (4 14). Suppose one starts with point 2. Initially the point array and line array are as follows:

point array 2 line array empty

After picking up the lines (pairs) containing 2 one has:

point array 2 1 10 9 line array (1 2) (2 10) (2 9)

There are no further lines containing point 1. After searching for the lines containing point 10 one gets point array 2 1 10 9 11 line array (1 2) (2 10) (2 9) (10 11)

Scanning for the lines containing 9 gives the new line (3 9) and the new point 3. Further scanning for the lines containing 11 and 3 gives nothing new, so the final result is:

point array 2 1 10 9 11 3 line array (12) (2 10) (2 9) (10 11) (3 9).

The component contains six points and five lines.

Once a component is found, the algorithm generates all the ways of directing the arrows on that component (i.e., circling a number in each line of the component). The methods of doing this are based on the idea of forced choices. A forced choice occurs if one of the numbers in a pair cannot be circled, either because it has been circled in some other pair, or because one has decided for some other reason that it is not to be circled. In that case, one is forced to circle the other number in the pair, and this may in turn trigger other forced choices.

In dealing with a component, the algorithm decides whether it is a cyclic component or a tree. A component is cyclic if it contains the same number of points as lines, and it is a tree if the number of lines in the component is one less than the number of points. If the number of lines is greater than the number of points, then the component contains more than one cycle, and there is no solution. For example, the component constructed above is a tree because it has six points and five lines.

If the component is a tree, there are as many solutions as there are points in the tree. The solution corresponding to a point is obtained by decreeing that the point will be the root. This means that no arrows will be directed into that point; equivalently, that point will not be circled in any pair. The rest of the choices are then forced. Continuing with the component constructed above, the point array and line array are:

point array 2 1 10 9 11 3 line array (1 2) (2 10) (2 9) (10 11) (3 9)

If one chooses 9 as the root, then one is forced to circle 2 in (2 9) and 3 in (3 9). This forces one to circle 1 in (1 2) and 10 in (2 10). One is then forced to circle 11 in (10 11). A different pattern of circling would result from each choice of root, and one would want to make that choice which used as many circles as possible from the previous puzzle solution, in order to minimize the number of signal paths that have to be revised.

If the component is cyclic, there are two solutions, depending on which way the arrows are oriented around the cycle. This is illustrated with a component that has the following point array and line array.

point array 12 3 9 10 11 line array (1 3) (10 11) (3 9) (2 10) (1 2) (2 9).

This component is cyclic because it has the same number of points as lines. The first step is to find the cycle. To do this one temporarily eliminates points and lines as one discovers that they don't lie on the cycle. A point is eliminated if it occurs in only one line, and a line is eliminated if it contains an eliminated point. Point 11 occurs only in line (10 11) so one temporarily eliminates point 11 and line (10 11), giving the following point array and line array:

point array 12 3 9 10 line array (1 3) (3 9) (2 10) (12) (2 9) 10 occurs only in (2 10) so one eliminates point 10 and line (2 10) temporarily, giving point array 1 2 3 9 line array (1 3) (3 9) (12) (2 9)

Now every point occurs in more than one line; this indicates that the remaining lines are in the cycle. One can choose any such line, and the two ways of circling a point in that line will force the choice of points to circle in all the lines. For example, if one circles the 1 in (1 3) then the rest of the choices are forced, with the following result:

(1̲ 3) (10 1̲1̲) (3̲ 9) (2 1̲0̲) (1̲ 2) (2 9̲)

The solution chosen uses as many as possible of the arrows (circled numbers) that were used in the previous solution for that crossbar. Solutions are found on a component-by-component basis, and for each component the algorithm chooses the solution that revises the smallest number of signal paths.

Eventually, some output port will select an input port in such a way that the routing path has no solution. At that point, it becomes necessary to change the setting of at least one first-stage crossbar. The basic step in changing the first-stage settings is called an "exchange." In describing what an exchange is, it is useful to recall that the switch settings in a first-stage crossbar determine a one-to-one correspondence between the inputs and outputs of that crossbar. Furthermore, each output of each first-stage crossbar has fixed connections to a unique pair of second-stage crossbars. An exchange involves a single first-stage crossbar; its effect is to switch the outputs connected to two inputs of that crossbar.

As an example, consider first-stage crossbar number 5. Its output ports are associated with the following pairs:

(0 5), (1 4), (2 3), (6 14), (7 13), (8 12), (9 11), (10 15).

Its first output is connected to second-stage crossbars 0 and 5, its second output, to second-stage crossbars 1 and 4, and so forth. Exchanging the third and fifth outputs means that the input signal that previously had gone to the third output now goes to the fifth, and the signal that previously had gone to the fifth output now goes to the third. The result of such an exchange is to replace (2 3) by (7 13), and (7 13) by (2 3), in the list of pairs associated with each of the third-stage cross-bars. The control algorithm looks for an exchange that will make it possible to solve the input/output paths associated with all the third-stage crossbars.

For example, suppose a third-stage crossbar has selected the following pairs:

(3̲ 9) (4 1̲3̲) (4̲ 12) (1̲2̲ 14) (1 2̲) (10 1̲1̲) (1̲ 3) (2 1̲0̲) (2 9) (4 1̲4̲).

This has a solution, as indicated by the underscoring. But suppose that the output port which had selected (4 14) now selects (1 9), giving the following ten pairs:

(3 9) (4 13) (4 12) (12 14) (1 2) (10 11) (1 3) (2 10) (2 9) (1 9).

There no longer is a solution. The control algorithm discovers trouble when it constructs the components of the resulting graph. Those components are shown in FIG. 14.

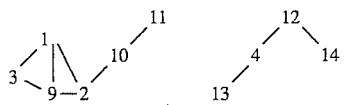

FIG. 14. Graph corresponding to the list (3 9) (4 13) (4 12) (12 14) (1 2) (10 11) (1 3) (2 10) (2 9) (1 9).

There is no solution because the component including points 1,2,3,9,10 and 11 has more than one cycle. At this point the control algorithm looks for an exchange that will fix up this bad component. The exchange must involve one of the lines in the cyclic part of that component; it will do no good to get rid of lines (2 10) or (10 11) because those lines don't lie in cycles. The only useful exchanges involve the pairs (1 2), (1 3), (1 9), (2 9) and (3 9). The control algorithm inspects each of these exchanges in turn to see if it makes the puzzle solvable. An example of an exchange that doesn't work involves the pairs (1 3) and (9 10), both of which are outputs of crossbar 4. This exchange gets rid of the troublesome line (1 3), but puts line (9 10) into the same component, leaving the component with more than one cycle. However, most exchanges will cure the problem; an example of such an exchange involve (1 9) and (3 7), both of which are on first-stage crossbar 10. The algorithm considers every exchange that makes a solution possible. However, each such exchange may affect the lists of pairs associated with other third-stage crossbars, and may make routing paths unsolvable. So the algorithm searches through the exchanges, looking for one that makes all routing paths solvable for each third-stage crossbar. Among the exchanges that make all routing paths solvable, the algorithm selects the one that minimizes the amount of signal path revision.

In rare cases a situation may arise in which no single exchange makes all routing paths solvable. When this happens, the algorithm chooses the exchange which takes care of the routing path that originally caused trouble, and minimizes the number of other routing paths that become unsolvable after the exchange. The algorithm then selects another unsolvable routing path, chooses an exchange to resolve that one, and so on until all the routing paths become solvable. In all cases, the next exchange to be made is chosen subject to the following rules:

(a) to avoid getting into a loop, the pairs involved in the next exchange must not have been involved in any previous exchange that occurred during the present computation;

(b) the exchange must resolve one of the routing paths which is currently unsolvable; and (c) among all such exchanges, must minimize the number of unsolvable routing paths created.

In the most frequent case, where there are several exchanges which would make all the routing paths solvable. That one is chosen which minimizes the number of signal paths that need to be revised.

In extremely rare cases, the algorithm may perform a long series of exchanges without making all selections solvable with a routing path. To deal with those cases and guarantee the theoretical completeness of the signal path revision algorithm, a backup procedure is needed. This backup procedure simply sets up all the first-stage crossbars at random; i.e., for each of these crossbars a random one-to-one correspondence between the input and output ports is set up. One can prove that, with sufficiently high probability, such a random setting of the first-stage crossbars will allow all selections to be routed, no matter which inputs have been selected by the various output ports. The backup algorithm simply keeps trying random settings of the first-stage crossbars until some setting allows all routing paths to be solved. This random procedure presents theoretical completeness and is unlikely ever to be needed in practice.

Another Routing Control Algorithm

An alternate solution algorithm may implement the rearrangement of switch configurations for the three-stage crossbar network work of FIG. 2. It is for IBM/PC compatible hardware based on TURBO PASCAL Version 3 and listed in the appendix.

The basic function of the software is to simulate the response for a requested change in the input selection at a specific output port while maintaining existing input connections for all other output ports. It also may provide simulated switch settings for the requested signal routings. In most cases the solution is obtained by changing switches within the single third-stage crossbar that services the specific output port and changing the associated second-stage switches. However, in some cases, it is necessary to exchange a pair of switches within the first-stage crossbars in order to achieve a solution. The complete program is listed hereinafter for reference.

The software uses binary words to represent crossbar switch settings and also to represent the specific wiring configuration between the first-stage and second-stage. The solution algorithm is based on direct bit-manipulations of these binary representations.

A crossbar switching matrix of size M×N provides capability to connect each of the N outputs to any of the M inputs. The switch configuration of a crossbar can be represented through specification of the input selected by each output. A binary word with M bits is used to define the selected input for each output. A single bit is set in the binary word at the bit position that represents the input selected. A crossbar switch configuration is thus given by the array of these N binary words. The resultant switch setting arrays for all crossbars in each stage are referred to as SWITCH1, SWITCH2 and SWITCH3.

The same type binary word representation is used for the interface wiring connections between the first-stage and second-stage crossbars. In this case, the binary words have one bit set for each of the two second-stage crossbars that are connected to a first-stage output. The complete wiring configuration is then specified by the array consisting of one such binary word for each first-stage output.

Figure 7:
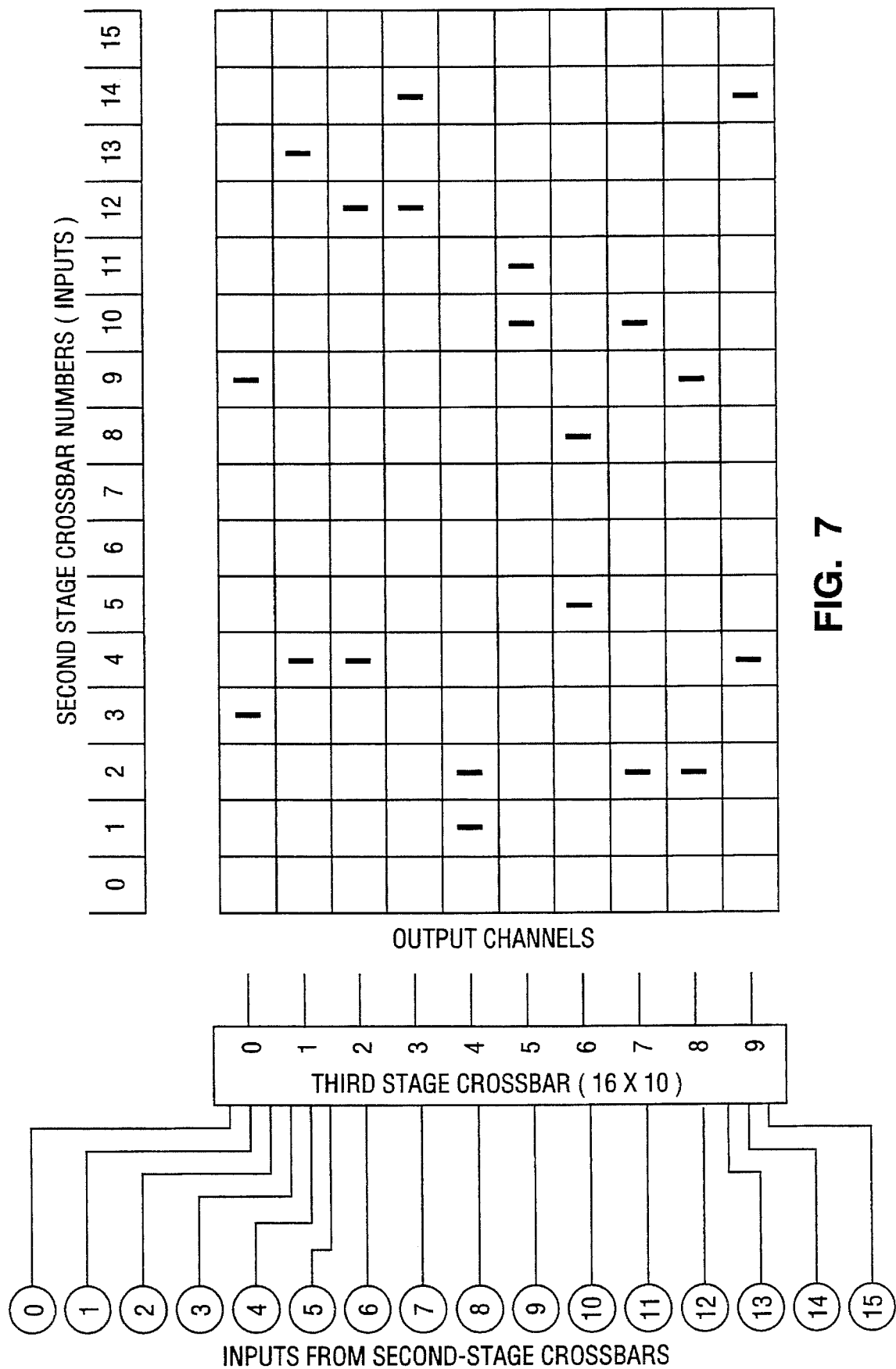
FIG. 7 is a typical allowable matrix for one routing algorithm useful in the switching network of FIG. 2.

The basic problem to be solved with this three-stage switching system is to find a compatible configuration for each third-stage crossbar that allows every output of that crossbar to be routed to its selected input on the first-stage crossbars. With the wiring configuration and first-stage switching constraints utilized, each first-stage input is available from two second-stage crossbars. Therefore, a binary word can be constructed for each third-stage output that has two bits set to represent the two allowable switch settings for that output. A typical matrix of such binary words for a 16×10 crossbar is illustrated in FIG. 7, and is referred to as the allowable matrix. This allowable matrix is converted to the required solution matrix by assigning one of the two allowable inputs ('columns') for each of the outputs ('rows'). Since only one wire connects each second-stage crossbar to each third-stage crossbar, the solution matrix must have no more than one bit assigned in any column.

The algorithm first identifies rows that have duplicate requests of other rows, using the procedure DUP-POP. The allowable array is created for all outputs by the procedure ALLOWS. This procedure provides for more than one first-stage output to be connected to a given input. The SETUP procedure assigns the information to a solution matrix for a single third-stage crossbar. The algorithm sweeps through this solution matrix, searching for columns with only one bit set. This sweeping process occurs in the procedure SWEEP. SWEEP eliminates columns with no set bits from further consideration in order to speed the process. When single-bit columns are found, the associated rows are assigned to those columns. The second bits in those rows are then zeroed. Since assigning rows to specific columns removes set bits from other columns, the algorithm continues sweeping through the columns until either no further assignments result, or until all of the rows are assigned.

At this point, any remaining unassigned columns will all have more than one set bit. If all of these columns have two set bits, then a solution is possible (i.e., the number of unassigned columns will equal the number of unassigned rows). If any of these columns have more than two set bits, then a solution is not possible without making a change in the first-stage switches (i.e., the number of unassigned columns will be less than the number of unassigned rows). This is referred to as a failed-solution.

If all rows have not been assigned, and a solution is possible, the algorithm then locates the first column with a set bit in the first unassigned row. This column is assigned to that row, with other bits in the column zeroed. This forced assignment is done by the procedure SOLVER. The algorithm then implements alternate column sweeps and forced assignments through recursive calls until all rows are assigned and the required solution is achieved.

The algorithm then assigns the completed solution to the switch array, SWITCH3, for the specific third-stage crossbars. The associated settings for the second-stage crossbar switch array, SWITCH2, are also specified. These actions are provided by the procedure SWITCHES.

This completes the solution cycle for cases where solutions i! are possible within a single third-stage crossbar. The switch arrays, with set bit positions corresponding to closed switches, are consistent with typical microprocessor controller requirements.

For cases where the column sweep process identifies a failed-solution, the algorithm proceeds to determine a pair of first-stage outputs that can be exchanged to allow for a solution. This determination is implemented by the procedure EXCHANGE. Since changes in the first-stage switches can affect all of the third-stage crossbars, this exchange must be handled very carefully to avoid creating more problems than it solves. The entire viability of the system depends upon selecting an exchange that allows for a rapid solution. Several features may be implemented to achieve efficient and reliable exchanges The algorithm first identifies exchange candidates that allow for solutions in the specific third-stage crossbar that had the failed-solution. Following this, the algorithm selects a particular exchange from these candidates that introduces the fewest solution problems among all of the other third-stage crossbar. The techniques for these processes are described in the following paragraphs.

The algorithm uses the fact that solution failures are associated with columns having more than two set bits. It obtains a solution after each single change request. Therefore, only a single row changes from a prior solution condition, and it is only necessary to remove one set bit from such columns to again achieve a solution condition. Changing the set bits appropriately for any row involved with such a column would eliminate the cause of the solution failure. Rows can be either directly or indirectly involved. The procedure ROWINVOLV selects these rows. Each involved row has an associated input request that defines a particular first-stage crossbar. Exchanges must occur within single first-stage crossbars. The first-stage output associated with an involved row can be exchanged with any other output on the same first-stage crossbar. Exchanges which are appropriate must correct the failed solution. The algorithm first tries a quick solution cycle using a condition that assures the failed solution is corrected. Only exchanges where a set bit for an involved row would be positioned in a column that had no set bits in the failed-solution are allowed for this first cycle. The procedure EX-CANDS tests for this condition and saves all exchange candidates satisfying it.

The algorithm calculates a parameter for each exchange candidate pair that gives a measure of the impact any exchange might have on other third-stage crossbars. The popularity of each input channel is defined as the number of third-stage crossbars that have any output requesting that input. This popularity value is calculated for each input channel in the procedure DUP-POP, and is also associated with each first-stage output in the procedure ALLOWS. Summing these two popularity values for any two outputs considered for exchange gives an indication of the extent third-stage crossbars might be affected by the exchange. In particular, if this popularity sum (PopSum) for any pair of leads equals one, then only the failed crossbar would use that pair of outputs.

Trials are performed for the saved exchange candidates to determine if any allow for solutions in every third-stage crossbar. The procedure EX-TRIAL performs these exchange trials, using the procedure SWEEP to determine if solutions are possible. The exchange trials are conducted starting with candidates having the lowest PopSum values. To avoid iterative loops, exchange candidates are used only once during any solution process. Since an exchange can be equivalent to two new requests, it is possible to create other failed-solutions that would require two exchanges to solve. This is avoided by rejecting any exchange that would create a failed-solution where more than two columns had three set bits, or where any column had in excess of three set bits. The trial exchanges continue until one is identified that provides solutions for all third-stage crossbars, or until all of the quick solution exchange candidates have been tried. In the former case, the identified exchange is implemented, and the solution and switch settings are completed.

For cases where the quick solution cycle does not provide an exchange pair satisfying all third-stage crossbars, additional exchange candidates are defined. These include exchanges of involved rows with all other outputs on their associated first-stage crossbars (again, screened to allow only those resolving the initial failed-solution). Trials are then performed with this complete candidate exchange group. The particular exchange pair that causes the fewest failed-solutions in other third-stage crossbars is selected. If a new failed-solution is created, the entire exchange process is repeated for the third-stage crossbar with that failed-solution. The algorithm continues with recursive calls until a configuration is achieved that provides solutions for all third-stage crossbars. The solution and switch settings are then completed as previously described.

A Two-Stage Network

Figure 6:
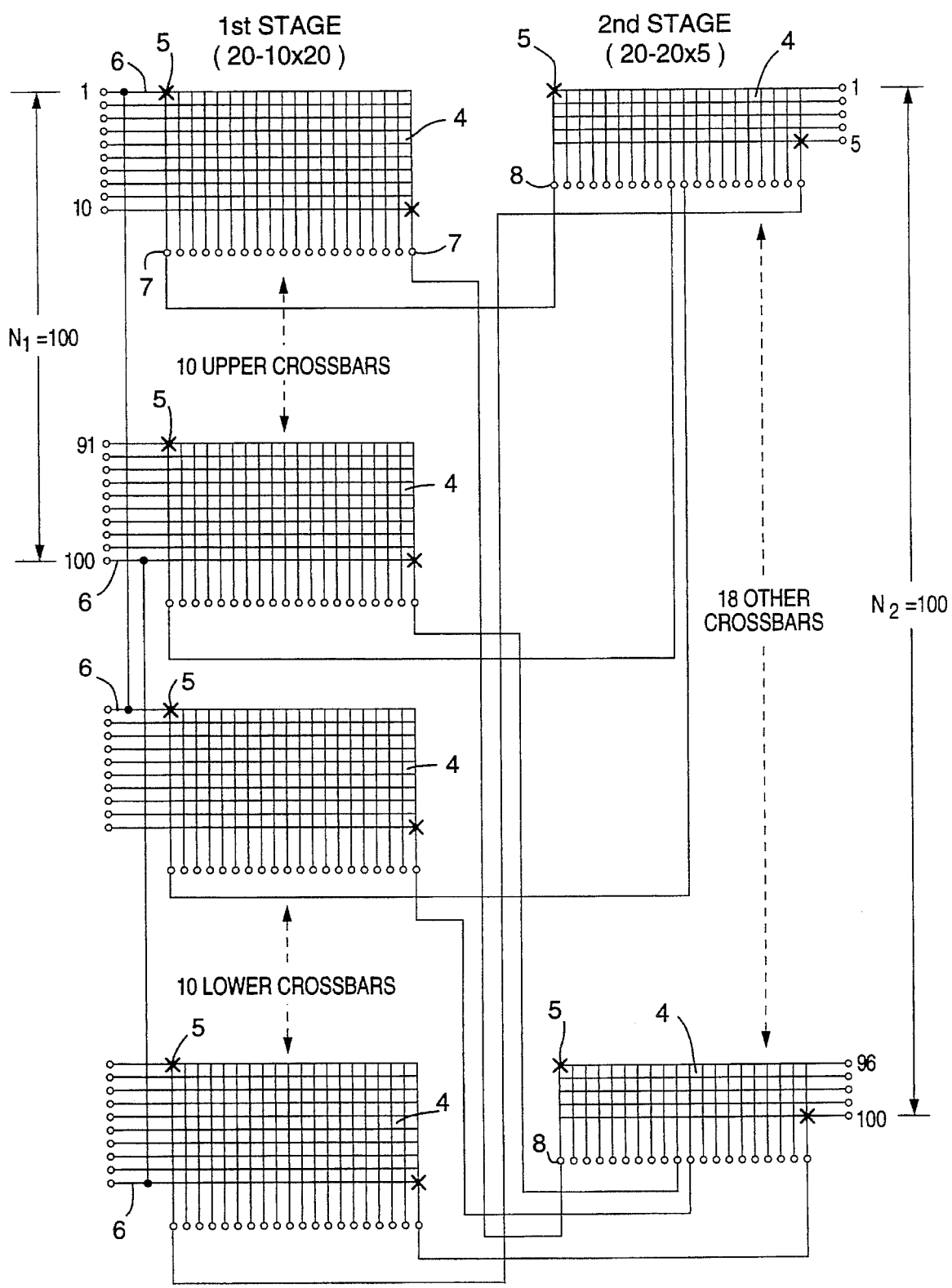
FIG. 6 is a schematic block diagram of a two-stage switching network embodying features of this invention.

The embodiment in FIG. 6 is a two-stage 100×100 connection network with 6,000 crosspoint switches. Like the three-stage network, this two-stage network allows each output port $N_2$ to select any input port $N_1$, with no restriction on the number of times an input port may be selected. With the help of signal path revision, it is always possible to set up the required non-interfering input-output paths.

Despite its greater number of crosspoints, each signal path passes through only two switches rather than three; the control algorithm is extremely fast, simple to implement and easy to understand; and setting up a new input-output connection never requires more than four existing paths to be revised.

The first-stage of the network consists of twenty 10×20 crossbars 4. The second-stage consists of twenty 20×5 crossbars 4. The total number of crosspoint switches 5 is therefore 20×(10×20)+20×(20×5)=6,000.

The connections between the two stages of crossbars are analogous to those between the second and third stages of a Clos network. Each second-stage crossbar receives exactly one signal from each of the twenty first-stage crossbars. For example, as shown, the first output 7 of the first crossbar 4 in the first-stage connects only to the first input 8 of the first crossbar 4 in the second-stage. The twentieth output 7 connects to the first input 8 of the twentieth crossbar in the second-stage.

The novelty in the architecture is the way the input signals are connected into the first-stage crossbars. The twenty first-stage crossbars are divided into two groups of ten, called the upper crossbars and the lower crossbars. Each input port $N_1(1-100)$ is hardwired to an input 6 of exactly one upper crossbar, and to an input 6 of exactly one lower crossbar. For example, in FIG. 6 input port 1 is hardwired to the first input 6 of the first upper crossbar and the first input 6 of the first of the ten lower crossbars. Input port 100 is hardwired to the last input 6 of the tenth upper and tenth lower crossbars.

Thus, an input $N_1$ can be referenced by a pair of numbers such as (3,7), indicating that it is connected to the third upper crossbar and the seventh lower crossbar. Exactly one hundred such pairs are possible, since each number in a pair is between 1 and 10. The input signals at input ports $N_1(1-100)$ are in one-to-one correspondence with the one hundred possible pairs. The pair (3,7) refers to the unique input signal hard-wired to upper crossbar 3 and lower crossbar 7.

Consider selection of the signal paths leading to the output ports 9 of a particular second-stage crossbar 4. There are five such output ports 1–5 for the first of the second-stage crossbars and the signal selected by each is given by a pair, designating an upper and a lower first-stage crossbar. There are at most five such signals (fewer if one of the output ports has selected no input port, or if two of them have selected the same input port). For each of these signals, it is always possible to select either the upper crossbar or the lower one, in such a way, that no two signals select the same crossbar.

An example will illustrate the algorithm for selection. Suppose the five selected signals correspond to the following pairs: (1,4),(1,6),(5,7),(3,6),(3,4). The first signal is available from upper crossbar 1 and lower crossbar 4, the second from upper crossbar 1 and lower crossbar 6, etc. Upper crossbar 5 occurs only in the pair (5,7), so one uses it for that pair. The remaining pairs are (1,4),(1,6),(3,6) and (3,4). No crossbar occurs in only one pair so one makes any arbitrary choice, such as using upper crossbar 1 for the pair (1,4). This leaves the pairs (1,6),(3,6) and (3,4). Since upper crossbar 1 has already been used, one must obtain signal (1,6) from lower crossbar 6. This forces one to obtain signal (3,6) from upper crossbar 3 and signal (3,4) from lower crossbar 4.

The following rules will always determine a routing of signals to a given second-stage crossbar:
  (i) if a given first-stage crossbar occurs in only one pair, then use it to select the signal corresponding to that pair;
  (ii) if a selection is forced (for example, if signal (1,6) is to be selected, and upper crossbar 1 is being used to select some other input signal), then one must select input signal (1,6) from lower crossbar 6;
  (iii) if neither rule (i) nor (ii) applies then make an arbitrary selection.

A key property of this scheme is that, in the selection of signal paths, there is no interaction between the various second-stage crossbars. This means that, when an output port selects some input, the only signal paths that need to be revised will involve output ports on the same crossbar. This architecture comes very close to being non-blocking Various other routing control algorithms may be useful with the two-stage and three-stage networks that are described.

We claim:

1. A switching network for selectively connecting any one of $N_2$ output ports to any one of $N_1$ input ports, wherein $N_1$ and $N_2$ are positive integers, comprising a plurality of first-stage crossbars collectively having a total of said $N_1$ input ports and each crossbar having multiple outputs;

a plurality of second-stage crossbars each having multiple inputs and multiple outputs;

means connecting each output of each first-stage crossbar to one input of two second-stage crossbars;

a plurality of third-stage crossbars each having multiple inputs and collectively having a total of said $N_2$ output ports; and means connecting each second-stage crossbar to each third-stage crossbar.

2. The switching network of claim 1, wherein each crossbar is a n·m generalized connector of depth one consisting of n crossbar inputs, m crossbar outputs and a crosspoint connected between each crossbar input and crossbar output.

3. The switching network of claim 1, wherein more than one output port may selectively connect to the same input port.

4. The switching network of claim 2, further comprising control means for selectively rearranging the crosspoint connections in each of said first, second and third-stage crossbars in accord with a routing algorithm to satisfy all requests to connect any one of said $N_2$ output ports to any one of said $N_1$ input ports.

5. The switching network of claim 4, wherein for a particular selection of input port by an output port said routing algorithm attempts to route a signal path for that selection by first determining all switching patterns possible in the crosspoints of the second and third-stage crossbars to satisfy all selections of input ports made by all output ports without switching any crosspoint in said first-stage crossbars and then implements the switching pattern which results in the minimum number of switched crosspoints in the second and third-stage crossbars.

6. The switching network of claim 4 further comprising a routing algorithm wherein failing to determine any switching pattern in the crosspoints of the second and third-stage crossbars which satisfies all of said selections, the algorithm then determines an exchange of first-stage outputs which does satisfy all of said selections and implements the exchange in said first-stage outputs which results in the minimum number of switched crosspoints in all of said second and third-stage crossbars.

7. A switching network for selectively connecting any one of $N_2$ output ports to any one of $N_1$ input ports, wherein $N_1$ and $N_2$ are positive integers, comprising:

a plurality of first-stage crossbars each having multiple inputs and multiple outputs;

a plurality of second-stage crossbars each having multiple inputs and collectively having a total of said $N_2$ output ports;

a set of said $N_1$ input ports;

means connecting each of said $N_1$ input ports of the set to one input in each of two first-stage crossbars;

means connecting each first-stage crossbar to each second-stage crossbar.

8. The switching network of claim 7, further comprising control means for selectively rearranging the crosspoint connections in each second-stage crossbar in accord with a routing algorithm to satisfy all requests to connect any one of said $N_2$ output ports to any one of said $N_1$ input ports.

9. The switching network of claim 8, wherein each crossbar is a n·m generalized connector of depth one consisting of n crossbar inputs, m crossbar outputs and a crosspoint connected between each crossbar input and crossbar output.

10. The switching network of claim 8, wherein more than one output port may selectively connect to the same input port.

* * * * *

UNITED STATES PATENT AND TRADEMARK OFFICE
CERTIFICATE OF CORRECTION

PATENT NO. : 5,469,154
DATED : November 21, 1995
INVENTOR(S) : Richard M. Karp

It is certified that error appears in the above-indentified patent and that said Letters Patent is hereby corrected as shown below:

Col. 6, line 32, delete "ii"

Col. 8, lines 45 and 56, "12" should be --- 1 2 ---

Col. 8, lines 57 and 61, "(12)" should be --- (1 2) ---

Col. 9, line 1, change the underscoring in "(1 2)" with the underscoring as follows --- (1 2) ---

Signed and Sealed this

Sixth Day of August, 1996

Attest:

BRUCE LEHMAN

Attesting Officer

Commissioner of Patents and Trademarks